United States Patent
Kishioka et al.

(10) Patent No.: US 6,599,967 B2
(45) Date of Patent: *Jul. 29, 2003

(54) PRESSURE-SENSITIVE ADHESIVE SHEET AND METHOD OF FIXING FUNCTIONAL FILM

(75) Inventors: Hiroaki Kishioka, Ibaraki (JP); Masahiro Ohura, Ibaraki (JP)

(73) Assignee: Nitto Denko Corporation, Osaka (JP)

( * ) Notice: Subject to any disclaimer, the term of this patent is extended or adjusted under 35 U.S.C. 154(b) by 70 days.

This patent is subject to a terminal disclaimer.

(21) Appl. No.: 09/915,025

(22) Filed: Jul. 25, 2001

(65) Prior Publication Data

US 2002/0035177 A1 Mar. 21, 2002

(30) Foreign Application Priority Data

Aug. 1, 2000 (JP) ........................................ 2000-233105

(51) Int. Cl.$^7$ .................................................. C08K 5/24
(52) U.S. Cl. ........................ 524/261; 156/329; 428/429; 525/100; 525/101
(58) Field of Search .................... 524/261; 525/100, 525/101; 428/429; 156/329

(56) References Cited

U.S. PATENT DOCUMENTS 6,451,156 B2    9/2002   Kishioka et al. ............ 156/329

FOREIGN PATENT DOCUMENTS

| JP | 1-178567  | 7/1989  |
| JP | 1-178568  | 7/1989  |
| JP | 10-279900 | 10/1998 |

*Primary Examiner*—Bernard Lipman
(74) *Attorney, Agent, or Firm*—Knobbe Martens Olson & Bear LLP

(57) ABSTRACT

A pressure-sensitive adhesive sheet comprising a layer of a crosslinked pressure-sensitive adhesive, which is formed by 100 parts by weight of a homopolymer or a copolymer of a monomer containing an alkyl (meth)acrylates, as a principal component, 0.001 to 5 parts by weight of a silane-coupling agent, 0.001 to 5 parts by weight of a surfactant and a crosslinking agent, wherein a sol component of the crosslinked pressure-sensitive adhesive has a weight-average molecular weight of not less than 300,000 and a proportion of a low-molecular component having a molecular weight of not more than 100,000 in the sol component is not more than 15% by weight in the measurement of the molecular weight by the gel permeation chromatography method, which the sheet showing excellent weathering resistance capable of maintaining good outward appearance for a prolonged period of time without generating lifting or bubbles on the adhesive interface even under severe conditions such as long exposure to UV rays, while satisfying re-workability by which its pressure-sensitive adhesive upon release from a functional film does not remain on the adherend (glass surface).

4 Claims, No Drawings

PRESSURE-SENSITIVE ADHESIVE SHEET AND METHOD OF FIXING FUNCTIONAL FILM

BACKGROUND OF THE INVENTION

1. Field of the Invention

The present invention relates to sheet- or tape-shaped pressure-sensitive adhesive sheets, which are used mainly to fix a functional film to a display device.

2. Description of the Related Art

Pressure-sensitive adhesive sheets have recently been utilized in various fields because of good bonding operation properties. Among these, pressure-sensitive adhesive sheets comprising, as a base component, a homopolymer or copolymer of a monomer containing, as a base, an acrylic polymer (i.e. an alkyl (meth)acrylate) are superior in durability performances such as weathering resistance, heat resistance, deterioration resistance and the like. Therefore, they are used particularly preferably in the fields where these durability performances are required.

As one of uses of pressure-sensitive adhesive sheets, for example, there has been known a use of bonding/fixing functional films such as conductive film, antiglare film and the like to a display device (glass surface thereof). In view of use such as display device to which severe requirements on the appearance is made, it is required for these pressure-sensitive adhesive sheets to cause neither lifting nor formation of bubbles at the bonding interface when exposed to severe conditions such as UV rays for a long time, not to mention at the beginning of standing after bonding/fixing, thus making it possible to maintain good appearance.

Further, in a case a functional film such as an electroconductive film, an anti-glare film or the like included foreign matter, bubbles etc. bonding/fixing the functional film to (the glass surface of) a display or the film is hurt during sticking operation, it is necessary to release this film and bonding/fixing another film. Then, there is demand for re-workability of the pressure-sensitive adhesive by which the adhesive does not remain on the glass surface upon release.

To resolve these requirements, for maintenance of appearance, it is suggested to use acrylic pressure-sensitive adhesive sheets comprising an acrylic polymer, as a base component, and a silane-coupling agent incorporated into the acrylic polymer, thereby to improve the adhesion to the glass surface. Although use of the pressure-sensitive adhesive sheets improves the adhesion to glass to some extent, there still remains such a problem that lifting and formation of bubbles occur at the bonding interface when exposed to severe conditions such as described above, thus making it hard to maintain good appearance.

As a pressure-sensitive adhesive sheet resolving the problem described above, the present inventors have previously proposed a pressure-sensitive adhesive sheet comprising a crosslinked pressure-sensitive adhesive, which is formed by an acrylic polymer, a silane-coupling agent and a crosslinking agent, containing a sol component having specific distribution of molecular weights with less low-molecular components. By this constitution, good appearance can be maintained for a long period of time without lifting or generating bubbles on the adhesive interface even under the above-described severe conditions. Together with this maintenance of appearance, the re-workability mentioned above can however not be satisfied.

SUMMARY OF THE INVENTION

In light of the circumstances described above, an object of the present invention is to provide pressure-sensitive adhesive sheets for fixing a functional film to a display device, having excellent weathering resistance which cause neither lifting nor formation of bubbles at the bonding interface even when exposed to severe conditions such as UV rays for a long time, and satisfying re-workability by which the pressure-sensitive adhesive upon removal does not remain on the glass surface of the functional film.

To achieve this object, the present inventors made extensive study, and as a result, the present inventors have found that in preparing the inventors' previously produced pressure-sensitive adhesive sheet, that is, the pressure-sensitive adhesive sheet comprising a crosslinked pressure-sensitive adhesive, which is formed by an acrylic polymer, a silane-coupling agent and a crosslinking agent, containing a sol component having specific distribution of molecular weights with less low-molecular components, a surfactant along with the silane-coupling agent is incorporated into the acrylic polymer so as to adjust and suitably weaken the adhesion thereof to glass, whereby a pressure-sensitive adhesive sheet not only maintaining good appearance under severe conditions but also satisfying re-workability can be obtained, thus completing the present invention.

That is, the present invention is directed to a pressure-sensitive adhesive sheet comprising a layer of a crosslinked pressure-sensitive adhesive, which is formed by 100 parts by weight of a homopolymer or a copolymer of a monomer containing an alkyl (meth) acrylates as a principal component, 0.001 to 5 parts by weight of a silane-coupling agent, 0.001 to 5 parts by weight of a surfactant and a crosslinking agent, wherein a sol component of the crosslinked pressure-sensitive adhesive has a weight-average molecular weight of not less than 300,000 and a proportion of a low-molecular component having a molecular weight of not more than 100,000 in the sol component is not more than 15% by weight in the measurement of the molecular weight by the gel permeation chromatography method. Also the present invention is directed to a method of fixing a functional film, which comprises bonding/fixing the functional film to a display device through the pressure-sensitive adhesive sheets with the constitution described above.

As used herein, the sol component of the layer of the crosslinked pressure-sensitive adhesive refers to a sol component which is a soluble polymer dissolved in ethyl acetate when a predetermined amount Mo (about 0.5 g) of the above layer is covered with a fluororesin film having numerous pores (diameter: 0.2 $\mu$m), followed by dipping in ethyl acetate at 20° C. for 240 hours. The sol fraction thereof is determined by calculating from the formula: (Mt/Mo)×100 (% by weight) where Mt is an amount of the sol component and Mo is an initial weight before dipping.

Using the above soluble polymer (sol component), the weight-average molecular weight of the sol component and the proportion (% by weight) of the low-molecular component having a molecular weight of not more than 100,000 were determined from a molecular weight distribution curve by the gel permeation chromatography method (hereinafter referred to as the GPC method). The measuring conditions of the molecular weight distribution curve by the GPC method are as follows: concentration of sample; 1 mg/ml, amount of sample introduced; 500 mg, column temperature; 40° C., and flow rate; 1.0 ml/minute.

DETAILED DESCRIPTION OF THE PREFERRED EMBODIMENT

The acrylic polymer used as the base polymer in the present invention is a homopolymer or copolymer of a monomer containing an alkyl (meth)acrylate as a principal component, and the other monomer, capable of copolymerizing with the alkyl (meth)acrylate, can be used in combination with the alkyl (meth)acrylate.

The alkyl (meth)acrylate is a monomer represented by the following general formula:

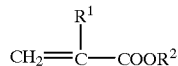

wherein $R^1$ is a hydrogen atom or a methyl group, and $R^2$ is an alkyl group having 1 to 18 carbon atoms. Specific examples thereof include methyl (meth)acrylate, ethyl (meth)acrylate, propyl (meth)acrylate, butyl (meth)acrylate, 2-ethylhexyl (meth)acrylate, octyl (meth)acrylate, nonyl (meth)acrylate, lauryl (meth)acrylate and the like.

The copolymerizable monomer, for example, there can be used any of various monomers, which are known as a monomer for modification of an acrylic pressure-sensitive adhesive, such as vinyl acetate, styrene, (meth)acrylonitrile, (meth)acrylamide, (meth)acrylic acid, 2-hydroxyethyl (meth)acrylate, 4-hydroxybutyl (meth)acrylate, 6-hydroxyhexyl (meth)acrylate, glycidyl (meth)acrylate, N,N-dimethylaminoethyl (meth)acrylate and the like. These copolymerizable monomers are usually used in the proportion of not more than 50% by weight based on the total amount of the alkyl (meth)acrylate and the copolymerizable monomer.

Such an acrylic polymer is preferably a polymer which exhibits a proper molecular weight distribution before crosslinking, particularly the low-molecular component exhibits a molecular weight smaller than as usual, so that the sol component has a weight-average molecular weight of not less than 300,000, preferably not less than 500,000 (usually up to 5,000,000), and the amount of a low-molecular component having a molecular weight of not more than 100,000 is not more than 15% by weight, preferably not more than 10% by weight by weight in the measurement of the molecular weight by the gel permeation chromatography method after forming a crosslinked structure by the acrylic polymer, the silane-coupling agent, the surfactant and the crosslinking agent. The molecular weight constitution of the sol component after crosslinking can be easily set within the above range by using the acrylic polymer with such a constitution to a proper crosslinking treatment.

Before crosslinking, the acrylic polymer with the above constitution can be obtained, for example, by polymerizing due to a solution polymerization method, an emulsion polymerization method or a bulk polymerization method using a polymerization initiator such as azo compound or peroxide, then adding an organic solvent capable of dissolving on a low-molecular component, and removing only the low-molecular component with separating; or adding a required additive to the polymer, forming the mixture into a tape, and treating the tape with the same organic solvent as described above, thereby to elute the low-molecular component.

According to alternative method of forming the acrylic polymer with the above constitution, an acrylic polymer with less low-molecular component can be obtained by using a polymerization solvent having a small chain transfer coefficient in the solution polymerization and polymerizing at the temperature as low as possible due to an increase of the monomer concentration, or employing the photopolymerization method using a photopolymerization initiator, that is, selecting the operation conditions on polymerization. The polymerization operation and the operation of removing the low-molecular component after polymerization may be appropriately used in combination.

In the present invention, examples of the silane-coupling agent to be incorporated into the acrylic polymer include vinyltrichlorosilane, vinyltris (β-methoxyethoxy)silane, vinyltriethoxysilane, vinyltrimethoxysilane, γ-methacryloxypropyltrimethoxysilane, β-(3,4-epoxycyclohexyl)ethyltrimethoxysilane, γ-glycidoxypropyltrimethoxysilane, γ-glycidoxypropyltriethoxysilane, N-β (aminoethyl)γ-aminopropyltrimethoxysilane, N-β (aminoethyl)γ-aminopropylmethyldimethoxysilane, γ-aminopropyltriethoxysilane, N-phenyl-γ-aminopropyltrimethoxysilane, γ-chloropropyltrimethoxysilane and the like.

The amount of the silane-coupling agent is within a range from 0.001 to 5 parts by weight, and preferably from 0.01 to 1 parts by weight, based on 100 parts by weight of the acrylic polymer. The amount outside of this range is not preferable because given a lower amount; the adhesion to the display device (glass) can not be sufficiently improved. On the other hand, while given a higher amount, an adverse influence is likely to be exerted on the bonding properties, which is not preferred.

In the present invention, examples of the surfactant to be incorporated into the acrylic polymer include ionic surfactants such as sodium higher alcohol sulfonate, sodiumalkyl benzene sulfonate, sodium dialkyl sulfosuccinate, alkyl (allyl) ether phosphate and alkyl (allyl) ether sulfate, and nonionic surfactants such as alkyl phenyl ether, alkyl ether and a polyoxyethylene-polyoxypropylene block copolymer.

These surfactants is within a range from 0.001 to 5 parts by weight, preferably 0.005 to 1 part by weight, based on 100 parts by weight of the acrylic polymer. The amount outside of this range is not preferable because given a lower amount, re-workability is not sufficiently improved, while given a higher amount, adhesive strength becomes too low, and lifting or bubbles may occur on the adhesive interface under sever conditions such as long exposure to UV rays.

In the present invention, in case the silane-coupling agent and the surfactant are incorporated into the acrylic polymer and the acrylic polymer is crosslinked with the crosslinking agent, the kind and amount of the crosslinking agent are appropriately selected so that the sol fraction after crosslinking, that is, the proportion of the soluble polymer is usually within a range from 5 to 60% by weight, and preferably from 10 to 40% by weight, and the weight-average molecular weight with respect to the sol component after crosslinking and the proportion of the lower-molecular component having a molecular weight of not more than 100,000, which are determined by the measurement of the molecular weight by the gel permeation chromatography method, are within the above range.

The crosslinking agent include conventionally known crosslinking agents, a polyfunctional melamine compound and/or a polyfunctional epoxy compound are particularly preferred. Specific examples thereof include methylated methylolmelamine, butylated hexamethylolmelamine, diglycidylaniline, glycerin diglicidyl ether and the like. The amount of the crosslinking agent is usually within a range from 0.001 to 10 parts by weight, and preferably from 0.01 to 5 parts by weight, based on 100 parts by weight of the acrylic polymer.

Use of a polyfunctional isocyanate compound is also preferred, and examples of such a compound include tolylene diisocyanate, hexamethylene diisocyanate, polymethylenepolyphenyl isocyanate, diphenylmethane diisocyanate, trimethylolpropanetolylene diisocyanate, polyether polyisocyanate, polyester polyisocyanate and the like. The amount of such a compound is usually within a range from 0.01 to 20 parts by weight, and preferably from 0.05 to 15 parts by weight, based on 100 parts by weight of the acrylic polymer.

The pressure-sensitive adhesive sheets of the present invention has a layer of the pressure-sensitive agent crosslinked with the crosslinking agent, which usually has a thickness within a range from 5 to 500 μm, and preferably from 10 to 100 μm. This layer may be formed into a sheet or tape by forming on one or both surfaces of a transparent substrate made of a plastic film having a thickness within a range from 10 to 1,000 μm, or may be formed into the same form described above with no substrate by forming on a proper release liner.

These pressure-sensitive adhesive sheets have an adhesive strength to glass, based on the interaction between the silane-coupling agent and the surfactant incorporated in specific amounts into the pressure-sensitive adhesive layer, is usually 3.5 to 10 N/25 mm width, preferably 3.5 to 7.5 N/25 mm width, and are used particularly preferably as an adhesive fixing material for fixing composite films having various functions, which usually have a thickness within a range from about 50 to 200 μm (for example, functional films such as conductive film, antiglare film, heat ray screening film, anti-reflective sheet, etc.) to a display device (glass surface thereof).

In the present invention, in order to fix the above functional film to the display device, the both are bonded/fixed through the pressure-sensitive adhesive sheets. Usually, the pressure-sensitive adhesive sheets are applied to the functional film and the resultant is applied to the display device (glass surface thereof). In a case the film included foreign matter, bubbles etc. during this bonding/fixing or the film is hurt during the sticking operation, then the above film should be released, where because of the suitably regulated adhesive strength of the pressure-sensitive adhesive sheet, the film can be easily released and the pressure-sensitive adhesive hardly remains on the glass surface. According to this fixing method, neither lifting nor bubbles occur on the adhesive interface not only at the initial stage of adhesion but also after left under severe conditions such as long exposure to UV rays, and thus the film can be fixed with good adhesion, and because of the absence of lifting or bubbles, good outward appearance can be maintained for a long period of time.

EXAMPLES

The present invention will be described in more detail by way of the following Examples. In the Examples, parts are by weight unless otherwise stated. Acrylicpolymer solutions A to C used in the following Examples and Comparative Examples are prepared by the following manners.

Acrylic Polymer Solution A 70 parts of 2-ethylhexyl acrylate, 25 parts of butyl acrylate, 5 parts of acrylic acid, 0.06 part of 3-hydroxypropyl acrylate and 45 parts of ethyl acetate as polymerization solvent were introduced into a three-necked flask and stirred for 2 hours during which a nitrogen gas was introduced into the flask. After oxygen in the polymerization system was removed in this manner, 0.2 part of benzoyl peroxide was added thereto, and the mixture was reacted for 10 hours under heating at 60° C. Thereafter, the solution was reacted for 2 hours under heating at 75° C., to complete the polymerization reaction. Ethyl acetate was added to the reaction solution to give an acrylic polymer solution A at a solid concentration of 45% by weight.

Acrylic Polymer Solution B 120 parts of n-heptane was added dropwise over the period of 6 hours to 100 parts of the acrylic polymer solution A under stirring, and after it was left for 24 hours, the supernatant was separated. Thereafter, adding toluene dissolved the polymer solution from which the supernatant had been separated; this operation of adding 120 parts of n-heptane and then separating the supernatant was repeated further 5 times. 80 parts of toluene was added to the final polymer solution thus obtained, and the resulting mixture was concentrated to give an acrylic polymer solution B at a polymer concentration of 25% by weight.

Acrylic Polymer Solution C

The acrylic polymer solutions A and B were mixed at a ratio of 1:1 by weight, to give an acrylic polymer solution C at a polymer concentration of 35% by weight.

Example 1

1.5 parts of tolylene diisocyanate, 0.15 part of γ-glycidoxypropyltrimethoxy silane and 0.1 part of a surfactant represented by formula (1) below were added to 100 parts of the acrylic polymer solution B, to prepare a pressure-sensitive adhesive solution.

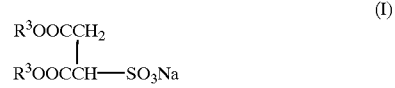

(wherein $R^3$ is an octyl group).

Then, this solution was cast and applied onto a polyethylene terephthalate film substrate of 188 μm in thickness in an amount to form a film having a thickness of 25 μm thereon after drying. This specimen was dried by heating at 130° C. for 3 minutes and subjected to aging at 50° C. for 72 hours, to prepare a pressure-sensitive adhesive sheet for adhesive strength testing, having a pressure-sensitive adhesive layer with a crosslinked structure. Further, a pressure-sensitive adhesive sheet for weathering resistance/re-workability testing comprising a pressure-sensitive adhesive layer of about 25 μm in thickness with a cross-linked structure arranged on a release liner of 38 μm in thickness consisting of polyethylene terephthalate film was prepared in the same manner as above.

Example 2

1.5 parts of diphenyl methane diisocyanate, 0.15 part of γ-methacryloxypropyltrimethoxy silane, and 0.1 part of a surfactant represented by formula (II) below were added to 100 parts of the acrylic polymer solution C, to prepare a pressure-sensitive adhesive solution. Using this solution, pressure-sensitive adhesive sheets for adhesive strength testing and for weathering resistance/re-workability testing were prepared in the same manner as in Example 1.

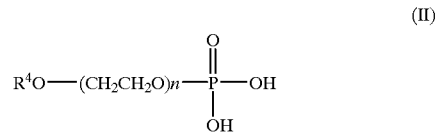

(wherein $R^4$ is a dinonyl phenyl group).

Comparative Example 1

1.5 parts of trimethylol propane tolylene diisocyanate, 0.15 part of γ-glycidoxypropyltrimethoxy silane, and 0.1 part of a surfactant represented by formula (II) above were added to 100 parts of the acrylic polymer solution A, to prepare a pressure-sensitive adhesive solution. Using this solution, pressure-sensitive adhesive sheets for adhesive strength testing and for weathering resistance/re-workability testing were prepared in the same manner as in Example 1.

Comparative Example 2

3 parts of trimethylol propane tolylene diisocyanate and 0.15 part of γ-glycidoxypropyltrimethoxy silane were added to 100 parts of the acrylic polymer solution B, to prepare a pressure-sensitive adhesive solution. Using this solution, pressure-sensitive adhesive sheets for adhesive strength testing and for weathering resistance/re-workability testing were prepared in the same manner as in Example 1.

The pressure-sensitive adhesive sheets for adhesive strength testing and for weathering resistance/re-workability testing in Examples 1 and 2 and Comparative Examples 1 and 2 were subjected to the following adhesive strength test, weathering resistance test and re-workability test. These results are as shown in Table 1. For reference, Table 1 shows the type of acrylic polymer solutions A to C used for preparing the pressure-sensitive adhesive solution, the presence or absence of the surfactant in the pressure-sensitive adhesive solution, as well as the sol fraction, the weight-average molecular weight, as determined by GPC method, of the sol in the pressure-sensitive adhesive layer having a crosslinked structure, and the proportion of low-molecular components having a molecular weight of 100,000 or less in the sol.

Adhesive Strength Test

From each pressure-sensitive adhesive sheet for adhesion testing, test specimens of 25 mm in width and 120 mm in length were cut off. These test specimens were stuck on a glass plate in an atmosphere at 23° C. by reciprocating a 2-kg roller thereon, and measured for their release adhesion at a direction of 90° at the same temperature at a peel rate of 300 mm/min. by a Tensilon type peel tester.

Weathering Resistance Test

Each pressure-sensitive adhesive sheet for weathering resistance/re-workability testing was laminated on an electroconductive film (polyethylene terephthalate film of 125 μm in thickness subjected to electroconductive treatment) and then fixed on a glass plate to prepare a sample specimen. A weathering resistance test was conducted by introducing this sample specimen into a 95% RH atmosphere at 80° C. or 60° C. for 500 hours. After this weathering resistance test, the state of the adhesive interface was examined by visual inspection, and "○" was assigned to a specimen free of bubbles and lifting as defects in outward appearance, while "X" was assigned to a specimen having bubbles and lifting even at a slight degree.

Re-workability Test

Each pressure-sensitive adhesive tape for weathering resistance/re-workability testing was laminated on the same electroconductive film as above and fixed on a glass plate in an atmosphere at 23° C. to prepare a sample specimen. This sample specimen was left in the same atmosphere for 24 hours and peeled off at an arbitrary stress rate at a direction of 90°, and the degree of the remaining adhesive was examined by visual inspection where "○" was assigned to a specimen on which no adhesive remained, and "X" was assigned to a specimen on which the adhesive remained.

TABLE 1

|  | Example 1 | Example 2 | Comparative Example 1 | Comparative Example 2 |
|---|---|---|---|---|
| Type of acrylic polymer solution | B | C | A | B |
| Presence or absence of a surfactant | Present | Present | Present | Absent |
| Sol content: | | | | |
| Sol fraction (weight-%) | 15 | 10 | 29 | 15 |
| Weight-average molecular weight (ten thousand) | 58 | 47 | 49 | 58 |
| Low-molecular components (weight-%) | 6 | 12 | 25 | 6 |
| Adhesive strength test (N/25 mm width) | 4.0 | 4.4 | 5.5 | 7.9 |
| Weathering resistance test | ○ | ○ | X | ○ |
| Re-workability test | ○ | ○ | ○ | X |

As can be seen from Table 1, the pressure-sensitive adhesive sheets of the invention in Examples 1 and 2 show suitable adhesive strength to glass, have good weathering resistance without generating bubbles or lifting on the adhesive interface after the weathering resistance test, and satisfy re-workability.

On the other hand, the pressure-sensitive adhesive sheet in Comparative Example 2 where no surfactant was added to the crosslinked pressure-sensitive adhesive layer was inferior in re-workability. Further, the pressure-sensitive adhesive sheet in Comparative Example 1 where the molecular weight of the sol component in the crosslinked pressure-sensitive adhesive layer was outside of the range of the present invention was inferior in weathering resistance.

As described above, the present invention can provide a pressure-sensitive adhesive sheet excellent in weathering resistance and re-workability by permitting sol in a silane-coupling agent- and a surfactant-containing acrylic polymer crosslinked by a crosslinking agent to have specific molecular-weight distribution with a smaller amount of low-molecular components, and this sheet can be used to adhesive-fix a functional film to a display thereby maintaining good appearance for a long period of time without generating lifting or bubbles even in weathering resistance test. Further, even if release of the sheet is required after bonding/fixing, the sheet can demonstrate good re-workability by which the pressure-sensitive adhesive does not remain on the glass surface.

What is claimed is:

1. A pressure-sensitive adhesive sheet comprising a layer of a crosslinked pressure-sensitive adhesive, which is formed by 100 parts by weight of a homopolymer or a copolymer made of a monomer containing an alkyl (meth) acrylates as a principal component, 0.001 to 5 parts by weight of a silane-coupling agent, 0.001 to 5 parts by weight of a surfactant and a crosslinking agent, wherein a sol component of the crosslinked pressure-sensitive adhesive has a weight-average molecular weight of not less than 300,000 and a proportion of a low-molecular component having a molecular weight of not more than 100,000 in the sol component is not more than 15% by weight in the measurement of the molecular weight by the gel permeation chromatography method.

2. The pressure-sensitive adhesive sheet according to claim 1, wherein a sol fraction of the sol component of the layer of the crosslinked pressure-sensitive adhesive is within a range from 5 to 60% by weight.

3. The pressure-sensitive adhesive sheet according to claim 1, wherein the adhesive strength to glass is 3.5 to 10 N/25 mm width.

4. A method of fixing a functional film, which comprises bonding/fixing the functional film to a display device through the pressure-sensitive adhesive sheet of claim 1.

* * * * *